US010132949B2

(12) United States Patent
Rokkan et al.

(10) Patent No.: US 10,132,949 B2
(45) Date of Patent: Nov. 20, 2018

(54) SINGLE VESSEL RANGE NAVIGATION AND POSITIONING OF AN OCEAN BOTTOM SEISMIC NODE

(71) Applicant: Seabed Geosolutions B.V., Leidschendam (NL)

(72) Inventors: Arne Henning Rokkan, Olsvik (NO); Jean-Baptiste Danre, Bergen (NO)

(73) Assignee: Seabed Geosolutions B.V., Leidschendam (NL)

( * ) Notice: Subject to any disclaimer, the term of this patent is extended or adjusted under 35 U.S.C. 154(b) by 143 days.

(21) Appl. No.: 15/051,468

(22) Filed: Feb. 23, 2016

(65) Prior Publication Data
US 2016/0245945 A1 Aug. 25, 2016

Related U.S. Application Data

(60) Provisional application No. 62/119,887, filed on Feb. 24, 2015.

(51) Int. Cl.
*G01V 1/38* (2006.01)
*B63B 22/00* (2006.01)
(Continued)

(52) U.S. Cl.
CPC ............ *G01V 1/3852* (2013.01); *B63B 22/00* (2013.01); *B63B 35/00* (2013.01); *G01V 1/3808* (2013.01);
(Continued)

(58) Field of Classification Search
CPC ...... G01V 1/3835; G01V 1/38; G01V 1/3852; G01S 5/18; B63B 22/00; B63B 35/00
(Continued)

(56) References Cited

U.S. PATENT DOCUMENTS 3,477,560 A 11/1969 Welker
4,114,135 A 9/1978 Funk
(Continued)

FOREIGN PATENT DOCUMENTS

FR 2772931 A1 * 6/1999
WO 2016011502 1/2016

OTHER PUBLICATIONS

SAE COmments recieved 2014, "Marine Mammal Commission", Jul. 2014.*
(Continued)

*Primary Examiner* — Ian J Lobo
(74) *Attorney, Agent, or Firm* — Park, Vaughan, Fleming & Dowler LLP; Shane Nelson

(57) ABSTRACT

Apparatuses, systems, and methods for monitoring, positioning, and/or guiding a plurality of seismic nodes on or near the seabed by a plurality of acoustic pinging devices coupled to a deployment line and at least one surface buoy. The acoustic pinging devices are configured to emit a unique ID that may be detected by a receiver or transceiver located on each of the surface buoys. The acoustic pinging devices may be coupled to each node or only to a portion of the plurality of nodes (such as every two, three, or four nodes). The monitoring system may be configured to identify the ID, position, depth, and height of each seismic node during travel to the seabed and upon node touchdown with the seabed. A guidance system may be configured to guide the deployment of the deployment cable based upon node position data determined by the monitoring system.

25 Claims, 9 Drawing Sheets

(51) Int. Cl.
*B63B 35/00* (2006.01)
*G01S 5/18* (2006.01)

(52) U.S. Cl.
CPC ...... *G01V 1/3835* (2013.01); *B63B 2022/006* (2013.01); *G01S 5/18* (2013.01)

(58) Field of Classification Search
USPC .......................................... 367/19, 129, 124
See application file for complete search history.

(56) References Cited

U.S. PATENT DOCUMENTS

| | | | |
|---|---|---|---|
| 4,401,987 A | | 8/1983 | Cyr |
| 4,532,617 A | * | 7/1985 | Baecker ................. G01S 15/74 367/106 |
| 4,669,067 A | * | 5/1987 | Roberts ................ G01V 1/3835 367/106 |
| 5,331,602 A | | 7/1994 | McLaren |
| 5,668,775 A | | 9/1997 | Hatteland |
| 6,474,254 B1 | | 11/2002 | Ambs et al. |
| 6,501,704 B2 | | 12/2002 | Nishimura |
| 6,839,302 B2 | | 1/2005 | Austad et al. |
| 6,932,185 B2 | | 8/2005 | Bary et al. |
| 6,951,138 B1 | | 10/2005 | Jones |
| 7,139,647 B2 | | 11/2006 | Larsen |
| 7,366,056 B2 | | 4/2008 | Frivik et al. |
| 7,512,036 B2 | | 3/2009 | Crowell |
| 7,760,587 B2 | | 7/2010 | Abbot et al. |
| 3,005,584 A1 | | 8/2011 | Flynn |
| 8,009,516 B2 | | 8/2011 | Crowell |
| 8,139,442 B2 | | 3/2012 | Pearce et al. |
| 8,654,610 B2 | | 2/2014 | Megdal |
| 8,804,461 B2 | | 8/2014 | Imran |
| 8,824,239 B2 | | 9/2014 | Welker et al. |
| 8,908,476 B2 | | 12/2014 | Chun et al. |
| 9,829,589 B2 | | 11/2017 | Ray et al. |
| 2004/0004907 A1 | * | 1/2004 | Austad ................... G01V 1/201 367/154 |
| 2005/0018537 A1 | | 1/2005 | Welker et al. |
| 2008/0144442 A1 | * | 6/2008 | Combee ................... G01V 1/38 367/131 |
| 2009/0141587 A1 | * | 6/2009 | Welker ................. G01V 1/3817 367/16 |
| 2011/0116343 A1 | | 5/2011 | Groenaas et al. |
| 2011/0176383 A1 | * | 7/2011 | Jewell ................. G01V 1/3852 367/16 |
| 2011/0188349 A1 | | 8/2011 | Basilico |
| 2012/0020184 A1 | | 1/2012 | Wilson et al. |
| 2012/0294112 A1 | | 11/2012 | Gochnour et al. |
| 2012/0300582 A1 | * | 11/2012 | Winter ................. G01S 3/8022 367/19 |
| 2012/0327741 A1 | | 12/2012 | Pearce |
| 2013/0188450 A1 | | 7/2013 | Brizard et al. |
| 2013/0258806 A1 | | 10/2013 | Siliqi |
| 2014/0056100 A1 | | 2/2014 | Brizard |
| 2014/0169125 A1 | | 6/2014 | Voisin |
| 2014/0198607 A1 | | 7/2014 | Etienne et al. |
| 2015/0016218 A1 | * | 1/2015 | Welker ................. G01V 1/3817 367/16 |
| 2015/0092516 A1 | | 4/2015 | Frivik et al. |
| 2016/0025883 A1 | | 1/2016 | Lambert et al. |

OTHER PUBLICATIONS

International Search Report and Written Opinion in corresponding International Application PCT/IB2016/050945 dated Jun. 15, 2016.
Seismic Products, product brochure, Rev 1-2014, PartnerPlast AS Marine Subsea Group, Andalsnes, Norway.
V-NAV Acoustic Positioning System, technical specifications, May 2014, Applied Acoustic Engineering LTD, Great Yarmouth, United Kingdom.
TZ/OBC Shallow Water Seismic Cable Positioning, product brochure, May 2012, Sonardyne International Limited.
Cranford, A Direct-Recording Ocean-Bottom Seismograph, Bulletin of the Seismological Society of America, vol. 66, No. 2, 607-615 (Apr. 1976) ("Cranford").
Mattaboni, MITOBs: A Seismometer System for Ocean-Bottom Earthquake Studies, Marine Geophysical Researches 3 (1977), pp. 87-102 ("Mattaboni").
http://www.carrack.co.uk/minidobs.htm ("Carrack"), Carrack Measurement Technology, downloaded Jun. 20, 2017.
Willoughby, A Microprocessor-Based Ocean-Bottom Seismometer, Bulletin of the Seismological Society of America, vol. 83, No. 1., 190-217 (Feb. 1993) ("Willoughby").
Prothero, First Noise and Teleseismic Recordings on a New Ocean Bottom Seismometer Capsule, Bulletin of the Seismological Society of America, vol. 74, No. 1, 1043-1058 (Jun. 1984) ("Prothero").
Johnson, A Free-Fall Direct-Recording Ocean Bottom Seismograph, Marine Geophysical Researches 3 103-117 (1977) ("Johnson").
Sutton, Optimum Design of Ocean Bottom Seismometers, Marine Geophysical Researches 9 (1987), pp. 47-65 ("Sutton").
Schmalfeldt, Explosion-Generated Seismic Interface Waves in Shallow Water: Experimental Results, Saclantcen Report SR-71 (1983) ("Schmalfeldt").
Eguchi, A real-time observation network of ocean-bottom-seismometers deployed at the Sagami trough subduction zone, central Japan, Marine Geophysical Researches 20: 73-94, 1998 ("Eguchi").
Kirk, A Three-Component Ocean Bottom Seismograph for controlled Source and Earthquake Seismology, Marine Geophysical Researches 5, 1982, 327-341 ("Kirk").
Petition for Inter Partes Review of U.S. Pat. No. Re. 45,268, dated Apr. 27, 2018.
Petition for Inter Partes Review of U.S. Pat. No. 8,879,362, dated Apr. 27, 2018.
Petition for Inter Partes Review of U.S. Pat. No. 8,228,761, dated Apr. 27, 2018.

* cited by examiner

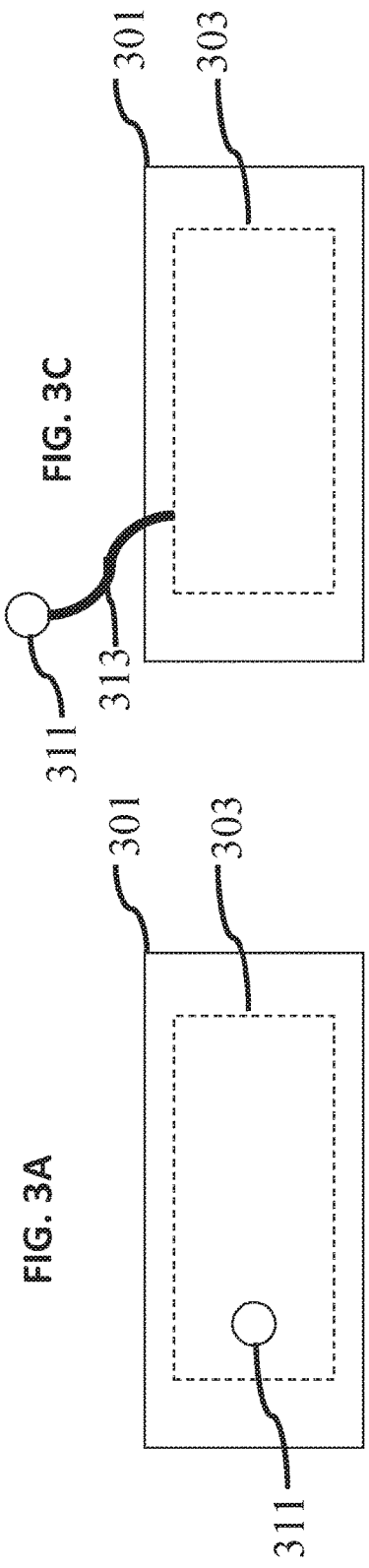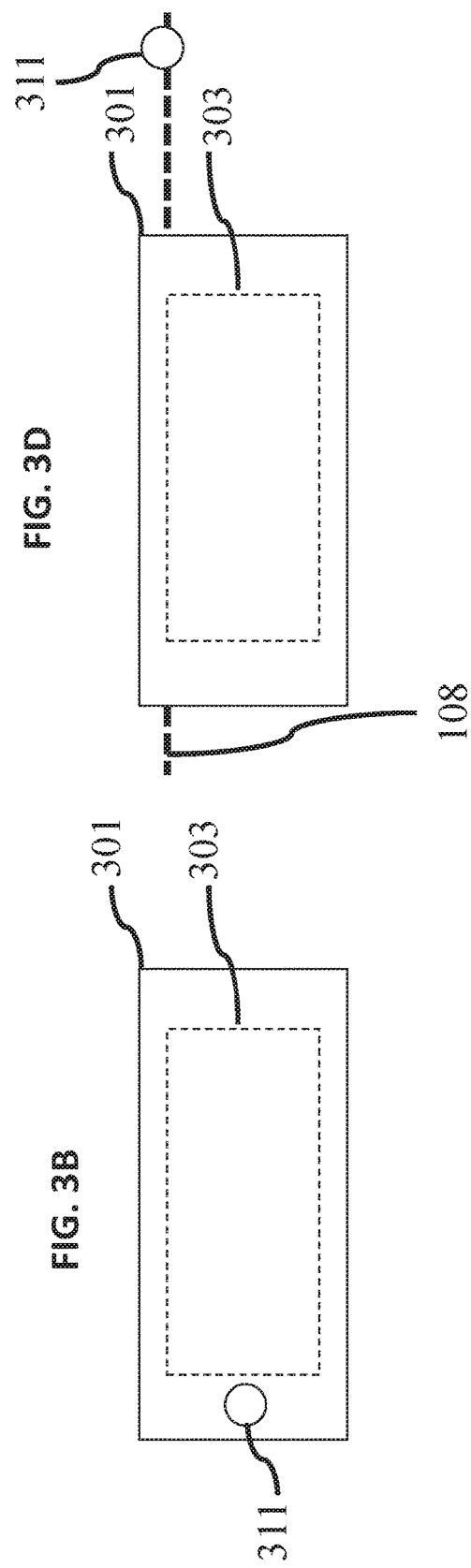

SINGLE VESSEL RANGE NAVIGATION AND POSITIONING OF AN OCEAN BOTTOM SEISMIC NODE

PRIORITY

This application claims priority to U.S. provisional patent application No. 62/119,887, filed on Feb. 24, 2015, the entire content of which is incorporated herein by reference.

BACKGROUND OF THE INVENTION

Field of the Invention

This invention relates to seismology and more particularly relates to the use of a single marine vessel for the monitoring of an ocean bottom seismic node, including the monitoring, positioning, and/or guiding of deployed autonomous seismic nodes.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

There are many methods to record the reflections from a seismic wave off the geological structures present in the surface beneath the seafloor. In one method, a marine vessel tows an array of seismic data recorders provided on streamers. In another method, a series of interconnected sensors are integrated with a cable that is towed behind a marine vessel and placed onto the seabed, which is commonly known as ocean bottom cables. In another method, autonomous seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel. The data recorders may be discrete, autonomous units, with no direct connection to other nodes or to the marine vessel, where data is stored and recorded.

When an ocean bottom cable or autonomous nodes attached to a cable are deployed in the sea, it is desirable to know the position of the cable and the positions of the nodes during and after deployment. One common way to identify some portions of the deployed cable is to use acoustic positioning transponders that are selectively placed at various portions of the cable. In general, a transponder is a remote acoustic beacon that requires the use of expensive Ultra Short Baseline (USBL) technology, which calculates the range and bearing for each transponder. Subsea transponders may transmit an acoustic signal to a marine vessel that calculates the position of the transponders (thus indicating the position of the cable) on the sea floor using USBL (or similar) technology. However, many problems exist with the use of transponders. Because transponders are expensive (as well as the necessary equipment and technology associated with the transponders and calculation of data received from transponders), they are used infrequently on segments of the deployment cable, often at intervals of 100 meters or more. In operation, cable is laid down not in perfect lines or patterns on the seabed, and thus the exact location of entire sections of cable (and the relevant nodes) are effectively unknown between the transponders. Recording seismic signals from the seabed requires proper positioning of the node and/or sensor and different orientations and improper configurations inhibit the coupling of the seismic sensor to the seabed, providing poor or inaccurate data. Still further, the deployment and retrieval of transponders requires additional equipment on the deployment vessel and additional time for the handling of such transponders.

A need exists for an improved method and system for the monitoring and/or guiding of cable deployed with nodes on the seabed, and in particular one that eliminates all or substantially all of the transponders typically used in such applications and eliminates the use of a USBL system. A new system is needed that is more cost effective, allows better positioning and accuracy of deployed nodes, and allows for the real-time (or near real-time) guidance of the deployed nodes.

SUMMARY OF THE INVENTION

Apparatuses, systems, and methods for monitoring, positioning, and/or guiding a plurality of seismic nodes on or near the seabed by a plurality of acoustic pinging devices coupled to a deployment line and at least one surface buoy. In one embodiment, the plurality of seismic nodes comprises a plurality of autonomous seismic nodes coupled to a deployment cable, and in another embodiment the plurality of seismic nodes comprises a plurality of sensors coupled to an ocean bottom cable.

The acoustic pinging devices are configured to emit a unique ID that may be detected by a receiver or transceiver located on each of the surface buoys. In one embodiment, each of the plurality of acoustic pingers is associated with a unique ID that is based upon a plurality of N frequencies and a plurality of Y internal addresses, wherein the number of unique IDs comprises N×Y unique IDs. In one embodiment each of the plurality of acoustic pingers is coupled to a separate one of the plurality of seismic nodes. In other embodiments the acoustic pinging devices may be coupled to a portion of the plurality of nodes (such as every two, three, or four nodes). The acoustic pinging devices may be attached to the deployment cable itself, coupled to the node via a tether, or be integrated within the node.

Each of the plurality of acoustic pingers may be configured to emit a ping at a predetermined interval for a period of time. In one embodiment, the predetermined interval is at least 2 seconds and the period of time is at least 5 minutes. Each of the plurality of acoustic pingers may be configured to be remotely actuated by a surface transceiver and/or respond to a request from a surface transceiver. In one embodiment, each of the plurality of acoustic pingers is coupled to and synchronized with a clock. In one embodiment, the pinger may comprise a transducer coupled to an electronics module or board. The pinger (or a portion thereof) may be located within a pressurized node housing of the node, may be located external to a pressurized node housing (such as being coupled to or placed within a node bumper or fender or other non-pressurized housing), may be a stand-alone unit coupled to the node by a connecting tether/wire, or may be a stand-alone unit attached to the same deployment line as the seismic nodes.

In one embodiment, the monitoring system is configured to identify the ID, position, depth, and height of each seismic node during travel to the seabed and upon touchdown with the seabed. The monitoring system may be configured to monitor the touchdown position of the plurality of seismic nodes on the seabed and communicate the touchdown position of each of the plurality of seismic nodes with the surface vessel at approximately the same time as touchdown. In one embodiment, a guidance system is configured to guide the deployment of the deployment cable based upon node position data determined by the monitoring system. The surface vessel may be configured to determine the position of each seismic node based on the detected pings and modify the deployment of the plurality of seismic nodes based on the detected pings.

In one embodiment, disclosed is a monitoring system for the deployment of seismic nodes on or near the seabed, comprising a plurality of seismic nodes coupled to a cable, a plurality of acoustic pingers coupled to the cable, wherein each pinger is configured to emit a ping at a predetermined interval, a surface vessel, configured to deploy the plurality of seismic nodes in a body of water, and at least one surface buoy coupled to the surface vessel by a first buoy connecting line, wherein each surface buoy comprises an acoustic receiver configured to detect the emitted pings. The buoy connecting line may be configured to provide power to the surface buoy and data transfer between the surface buoy and the surface vessel. In other embodiments, data is transmitted between the at least one surface buoy to the surface vessel through a wireless link.

In one embodiment, the system comprises a plurality of surface buoys coupled to the surface vessel. In such an embodiment, one of the plurality of surface buoys may be coupled to the surface vessel by a first buoy connecting line and at one of the plurality of surface buoys may be coupled to the surface vessel by a second buoy connecting line. In other embodiments, at least one of the plurality of surface buoys is positioned on one side of the deployment cable and at least one of the plurality of surface buoys is positioned on the other side of the deployment cable. The plurality of surface buoys may be configured to substantially remain in a predetermined position with respect to the other surface buoys and/or with respect to the plurality of pingers during the deployment of the seismic nodes. In some embodiments, a surface buoy may be self-powered and/or self-positioning, and may be an unmanned surface vessel (USV) or tail buoy. The surface buoy may comprise a propulsion system. The surface buoy may also comprise a GPS system, an acoustic transducer, and an acoustic transceiver.

In another embodiment, disclosed is a monitoring system for the deployment of autonomous seismic nodes on or near the seabed, comprising a plurality of autonomous seismic nodes coupled to a deployment cable, an acoustic pinger coupled to each of the plurality of seismic nodes, wherein each pinger is configured to emit a ping with a unique ID, a surface vessel, configured to deploy the plurality of autonomous seismic nodes in a body of water, and a plurality of surface acoustic receivers located behind the surface vessel, each configured to detect at least one of the emitted pings. In such an embodiment each of the plurality of acoustic receivers may located on at least one surface buoy or a USV. The surface buoys may be coupled to the surface vessel via a connecting line or be self-powered and self-positioning and connected to the surface vessel through a wireless link.

In another embodiment, disclosed is a method for monitoring the deployment of a plurality of seismic nodes on or near the seabed, comprising deploying a plurality of autonomous seismic nodes from a surface vessel, wherein the nodes are coupled to a deployment cable, wherein each node comprises an acoustic pinger configured to emit a ping, providing a plurality of surface buoys coupled to the surface vessel, wherein each surface buoy comprises an acoustic receiver configured to detect the emitted pings, and monitoring the deployment of the deployed seismic nodes by receiving the emitted pings at the plurality of surface buoys.

The method may include emitting pings from each of the acoustic pingers for a predetermined time after deployment. The method may include requesting each of the acoustic pingers to transmit a ping in response to a request from a surface transceiver. The method may include determining the node position of one or more of the plurality of seismic nodes at one or more subsea positions based on the received pings and communicating to the surface vessel such node position. In one embodiment, the node position comprises position coordinates, depth, and height of the node. The method may include positioning the deployment cable from the surface vessel based on one or more determined of the plurality of seismic nodes. The method may include monitoring a touchdown position of each of the plurality of seismic nodes. In such an embodiment, the method may include modifying the deployment position of the cable from the surface vessel based on a touchdown position of one or more of the plurality of seismic nodes and/or one or more predicted touchdown positions of the plurality of seismic nodes. The method may also include modifying the deployment position of the cable from the surface vessel based on a difference between an actual touchdown position of a seismic node and a predetermined seabed position of the seismic node.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 3A illustrates one embodiment of an ocean bottom node with a pinger within the pressurized node body.

FIG. 3B illustrates one embodiment of an ocean bottom node with a pinger within the non-pressurized node body.

FIG. 3C illustrates one embodiment of an ocean bottom node with a pinger coupled to the node body.

FIG. 3D illustrates one embodiment of an ocean bottom node attached to a deployment line with a pinger coupled to the deployment line.

DETAILED DESCRIPTION

Various features and advantages details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
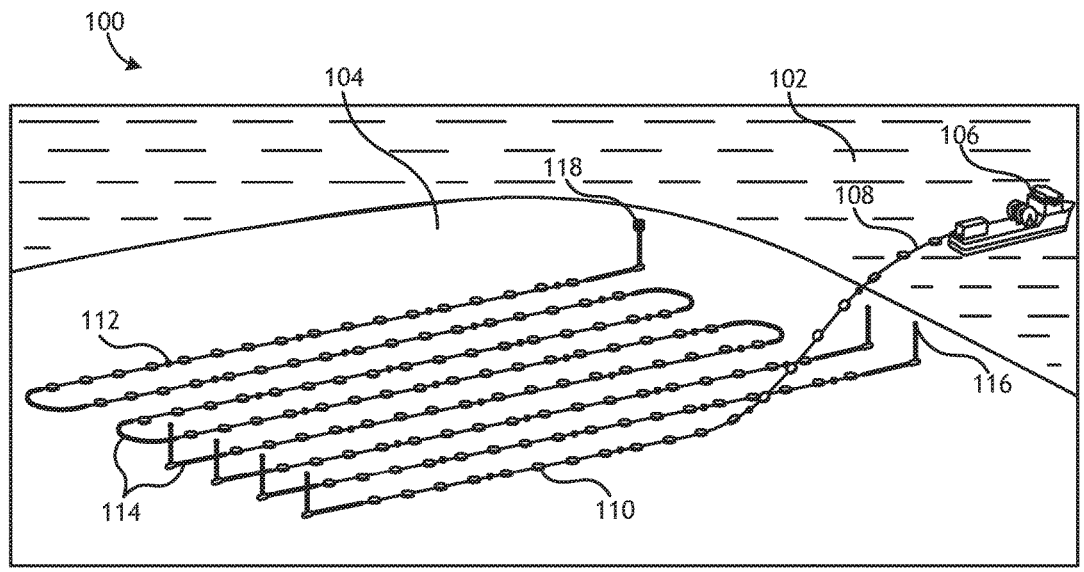
FIG. 1A is a schematic diagram illustrating one embodiment of a system for marine deployment of an autonomous seismic node.
Figure 1B:
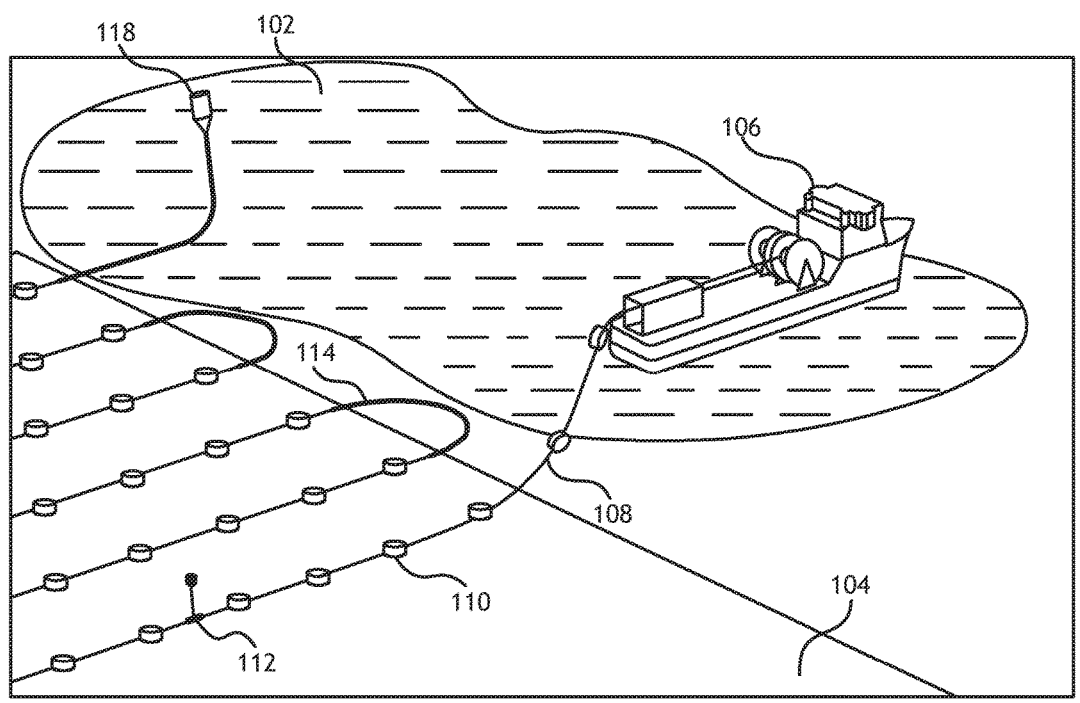
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108 (i.e., deployment cables). One or more seismic nodes 110 may be attached directly to the deployment line 108. Additionally, the marine deployment system 100 may include one or more acoustic positioning transponders 112, one or more weights 114, one or more pop up buoys 116, and one or more surface buoys 118. As is standard in the art, weights 114 can be used at various positions of the cable to facilitate the lowering and positioning of the cable, and surface buoys 118 or pop up buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of seismic nodes 110 on sea floor 104. In an embodiment, weights 114 may be coupled to deployment line 108 and be arranged to keep seismic nodes 110 in a specific position relative to sea floor 104 at various points, such as during start, stop, and snaking of deployment line 108.

FIG. 1B is a close-up view illustrating one embodiment of a system 100 for marine deployment of seismic nodes 110. In an embodiment, deployment line 108 may be a metal cable (steel, galvanized steel, or stainless steel). Alternatively, deployment line 108 may include chain linkage, rope (polymer), wire, or any other suitable material for tethering to marine vessel 106 and deploying one or more seismic nodes 110. In an embodiment, deployment line 108 and seismic nodes 110 may be stored on marine vessel 106. For example, the deployment line may be stored on a spool or reel or winch. Seismic nodes 110 may be stored in one or more storage containers. One of ordinary skill may recognize alternative methods for storing and deploying deployment line 108 and seismic nodes 110.

In one embodiment, deployment line 108 and seismic nodes 110 are stored on marine vessel 106 and deployed from a back deck of vessel 106, although other deployment locations from the vessel can be used. As is well known in the art, deployment line 108, such as a rope or cable, with a weight attached to its free end is dropped from the back deck of the vessel. Seismic nodes 110 are preferably directly attached in-line to deployment line 108 at a regular, variable, or selectable interval (such as 25 meters) while deployment line 108 is lowered through the water column and draped linearly or at varied spacing onto the seabed. During recovery each seismic node 110 may be clipped off deployment line 108 as it reaches deck level of vessel 106. Preferably, nodes 110 are attached directly onto deployment line 108 in an automated process using node attachment or coupling machines on board the deck of the marine vessel 106 at one or more workstations or containers. Likewise, a node detaching or decoupling machine is configured to detach or otherwise disengage seismic nodes 110 from deployment line 108. Alternatively, seismic nodes 110 can be attached via manual or semi-automatic methods. Seismic nodes 110 can be attached to deployment line 108 in a variety of configurations, which allows for free rotation with self-righting capability of seismic node 110 about deployment line 108 and allows for minimal axial movement on deployment line 108 (relative to the acoustic wave length). For example, deployment line 108 can be attached to the top, side, or center of seismic node 110 via a variety of configurations.

Once deployment line 108 and seismic nodes 110 are deployed on sea floor 104, a seismic survey can be performed. One or more marine vessels 106 may contain a seismic energy source (not shown) and transmit acoustic signals to sea floor 104 for data acquisition by seismic nodes 110. Embodiments of system 100 may be deployed in both coastal and offshore waters in various depths of water. For example, the system may be deployed in a few meters of water or up to several thousand meters of water. In some configurations surface buoy 118 or pop up buoy 116 may be retrieved by marine vessel 106 when seismic nodes 110 are to be retrieved from seabed 104. Thus, system 110 may not require retrieval by means of a submersible or diver. Rather, pop up buoy 116 or surface buoy 118 may be picked up on water surface 102 and deployment line 108 may be retrieved along with seismic nodes 110.

As mentioned above, to perform a seismic survey that utilizes autonomous seismic nodes, those nodes must be deployed and retrieved from a vessel, typically a surface vessel. In one embodiment a node storage and service system is coupled to one or more deployment systems. The node storage and service system is configured to handle, store, and service the nodes before and after the deployment and retrieval operations performed by a node deployment system. Such a node storage and service system is described in more detail in U.S. Patent Publication No. 2015/0331130, filed on May 13, 2015, incorporated herein by reference. Such a node deployment system is described in more detail in U.S. Patent Publication No. 2016/0041283, filed on Aug. 6, 2015, entitled Overboard System for Deployment and Retrieval of Autonomous Seismic Nodes, incorporated herein by reference.

Autonomous Seismic Node Design

Figure 2A:
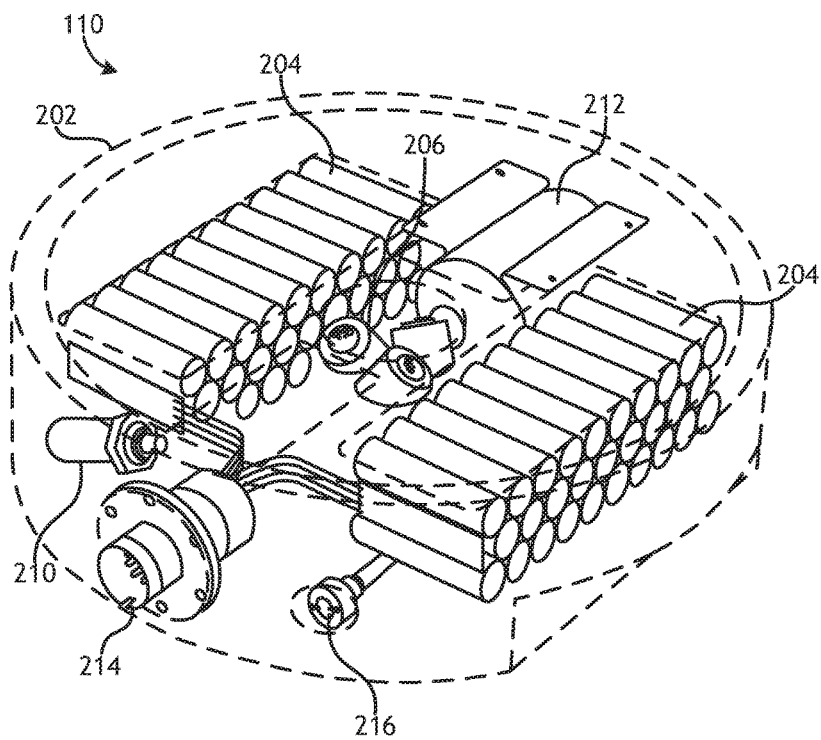
FIG. 2A illustrates a perspective view diagram of one embodiment of an autonomous seismic node.

FIG. 2A illustrates a perspective view diagram of autonomous ocean bottom seismic node 110. Seismic node 110 may include body 202, such as a housing, frame, skeleton, or shell, which may be easily dissembled into various components. Additionally, seismic node 110 may include one or more power sources 204. Additionally, the seismic node may include pressure release valve 216 configured to release unwanted pressure from seismic node 110 at a pre-set level. The valve protects against fault conditions like water intrusion and outgassing from a battery package. Additionally, the seismic node may include electrical connector 214 configured to allow external access to information stored by internal electrical components, data communication, and/or power transfer. During the deployment the connector is covered by pressure proof watertight cap 218 (shown in FIG. 2B). In other embodiments, the node does not have an external connector and data is transferred to and from the node wirelessly, such as via wireless electromagnetic or optical links. In other embodiments, there may be multiple connectors on the node, one for data transfer and one connector for power transfer.

In an embodiment, the internal electrical components may include one or more hydrophones 210, one or more (preferably three) geophones 206 or accelerometers, and data recorder 212. In an embodiment, data recorder 212 may be a digital autonomous recorder configured to store digital data generated by the sensors or data receivers, such as hydrophone 210 and the one or more geophones or accelerometers 206. One of ordinary skill will recognize that more or fewer components may be included in seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures at the bottom of the ocean, as is well known in the art. In an embodiment, the seismic node includes one or more components configured for wireless transmission of data to and from the node via electromagnetic or optical components. Data can be retrieved from the node during deployment or, more preferably, from the node while the node is on board the marine vessel.

In an embodiment, power source 204 may be lithium-ion battery cells or rechargeable battery packs for an extended endurance (such as 90 days) on the seabed, but one of ordinary skill will recognize that a variety of alternative battery cell types or configurations may also be used. In one embodiment, the power source for each node is one or more sets of rechargeable batteries that can operate in a sealed environment, such as lithium, nickel, lead, and zinc based rechargeable batteries. Numerous rechargeable battery chemistries and types with varying energy densities may be used, such as lithium ion, lithium ion polymer, lithium ion iron phosphate, nickel metal hydride, nickel cadmium, gel lead acid, and zinc based batteries. Various rechargeable battery chemistries offer different operating parameters for safety, voltage, energy density, weight, and size. For example, voltage for a lithium ion battery may offer 3.6V with an energy density of 240 Wh/kg and 550 Wh/L. In various embodiments, the battery cell(s) may include a lithium-ion battery cell or a plurality of lithium-ion windings. In another embodiment, the battery cell may include a lithium-ion electrode stack. The shape and size of the battery cell(s) may be configured according to the power, weight, and size requirements of the seismic sensor node. One of ordinary skill will recognize a variety of battery cell types and configurations that may be suitable for use with the present embodiments. In some embodiments, the rechargeable battery pack includes a plurality of battery cells.

Figure 2B:
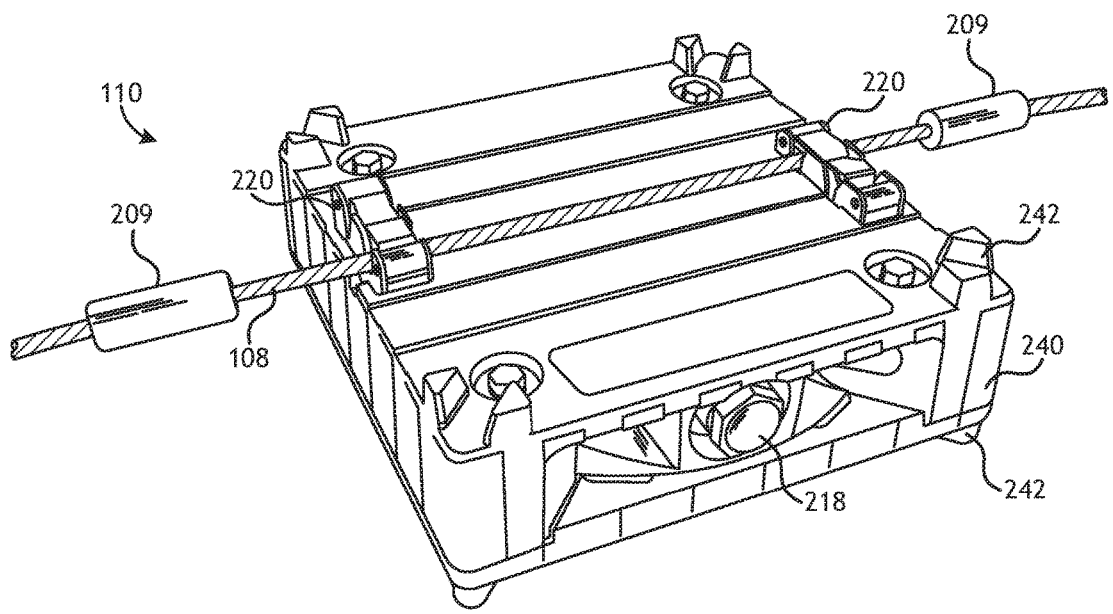
FIG. 2B illustrates a perspective view diagram of another embodiment of an autonomous seismic node.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In another embodiment, the pressurizing node housing is partially and/or substantially surrounded by a non-pressurized node housing that provides the exterior shape, dimensions, and boundaries of the node. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. While the node may be geometrically symmetrical about its central axis, symmetry is not a requirement. Further, the individual components of the node may not be symmetrical, but the combination of the various components (such as the pressurized housing and the non-pressurized housing) provide an overall mass and buoyancy symmetry to the node. In one embodiment, the node is approximately 350 mm×350 mm wide/deep with a height of approximately 150 mm. In one embodiment, body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external non-pressurized node housing 240. Various portions of non-pressurized node housing 240 may be open and expose the pressurized node housing as needed, such as for hydrophone 210, node locks 220, and data/power transfer connection 214 (shown with a fitted pressure cap 218 in FIG. 2B). In one embodiment, the upper and lower portions of the housing include a plurality of gripping teeth or protrusions 242 for engaging the seabed and for general storage and handling needs. Non-pressurized node housing 240 provides many functions, such as protecting the node from shocks and rough treatment, coupling the node to the seabed for better readings (such as low distortion and/or high fidelity readings) and stability on the seabed, and assisting in the stackability, storing, alignment, and handling of the nodes. Each node housing may be made of a durable material such as rubber, plastic, carbon fiber, or metal, and in one embodiment may be made of polyurethane or polyethylene. In still other embodiments, seismic node 110 may include a protective shell or bumper configured to protect the body.

In one embodiment, seismic node 110 comprises one or more direct attachment mechanisms and/or node locks 220 that may be configured to directly attach seismic node 110 to a deployment line 108. This may be referred to as direct or in-line node coupling. In one embodiment, the attachment mechanism 220 comprises a locking mechanism to help secure or retain the deployment line 108 to the seismic node 110. A plurality of direct attachment mechanisms may be located on any surfaces of the node 110 or node housing 240. In one embodiment, a plurality of node locks 220 is positioned substantially in the center and/or middle of a surface of a node or node housing. The node locks may attach directly to the pressure housing and extend through the node housing 240. In this embodiment, a deployment line, when coupled to the plurality of node locks, is substantially coupled to the seismic node on its center axis. In some embodiments, the node locks may be offset or partially offset from the center axis of the node, which may aid the self-righting, balance, and/or handling of the node during deployment and retrieval. The node locks 220 are configured to attach, couple, and/or engage a portion of the deployment line to the node. Thus, a plurality of node locks 220 operates to couple a plurality of portions of the deployment line to the node. The node locks are configured to keep the deployment line fastened to the node during a seismic survey, such as during deployment from a vessel until the node reaches the seabed, during recording of seismic data while on the seabed, and during retrieval of the node from the seabed to a recovery vessel. The disclosed attachment mechanism 220 may be moved from an open and/or unlocked position to a closed and/or locked position via autonomous, semi-autonomous, or manual methods. In one embodiment, the components of node lock 220 are made of titanium, stainless steel, aluminum, marine bronze, and/or other substantially inert and non-corrosive materials, including polymer parts. In some embodiments, a ferrule or other stop 209 may be positioned on either side of the node to help retain the node in a substantially constant position on the deployment line and/or to help attach/detach the node to the deployment line.

In one embodiment, each autonomous seismic node is coupled to an acoustic pinging device. In other embodiments, rather than having each node coupled to an acoustic pinging device, for cost effectiveness and less system complexity, only some subset of the total plurality of nodes is coupled to pingers. In such a system the total number of nodes would be greater than the total number of acoustic pinging devices. For example, in one embodiment, a pinger is coupled to the deployment line every two, three, or four or more nodes. Acoustic pinging devices are commercially available and, in general, continuously transmit a sonar signal that can be detected by an acoustic receiver. Each pinging device has a unique ID. In one embodiment, each node has a unique pinger transmit frequency such that a separate acoustic receiver can differentiate the pings and, consequently, the nodes. In one embodiment, the acoustic pinging device comprises a multi-frequency pinger which allows an operator to select the desired transmit frequency in the field. However, due to the limited number of frequencies that may be used effectively in any communications system, in another embodiment unique internal addresses can be provided to each pinger/transducer. For example, if the communications system uses N frequencies and Y addresses, then the set of pingers will have a combination of N×Y unique IDs. This combination of different internal addresses and frequencies allows for a unique identification of a large number of acoustic devices/pingers. Moreover, if the body of the acoustic device is equipped with a radio frequency identification (RFID) device/chip, the above-described internal address may be the RFID address. In one embodiment, the internal addresses are short because they are sent in the acoustic message by the pinger. In one embodiment, the frequency range may be between 20-70 kHz, but other ranges are possible. In still another embodiment, each pinger may be configured to communicate and/or respond via a specific time slot, such as the use of Time Division Multiple Access (TDMA). The use of specific time-slots provides another mechanism to uniquely identify the pingers.

FIGS. 3A-3D show various positions of an acoustic pinging device in relation to a seismic node, which may include pressurized node housing 303 surrounded by non-pressurized housing 301 (which may be similar to FIG. 2B). Other internal components of the node are not shown for convenience. All, substantially all, or a portion thereof of pinger 311 may be located within pressurized node housing 303 as shown in FIG. 3A, may be external to pressurized node housing 303 (such as being coupled to or placed within a node bumper or fender or other non-pressurized housing 301 as shown in FIG. 3B), may be a stand-alone unit coupled to the node by connecting tether/wire 313 as shown in FIG. 3C, or may be a stand-alone unit attached to the same deployment line 108 as the seismic nodes as shown in FIG. 3D.

In one embodiment, pinger 311 may comprise a transducer (e.g., a vibrating ceramic element that may be configured to generate and/or receive an acoustic wave) coupled to an electronics module or board. In some embodiments, both the transducer and electronics board are contained within the same protective housing/body, and in other embodiments the electronics component of the pinger is contained in a separate housing. Because the transducer typically must be in contact with water, at least a portion of the pinger (e.g., the transducer component) should be exposed to the water. In one embodiment, pinger 311 is coupled to power source 204 of the node, but in other embodiments pinger is coupled to its own dedicated power source. The pinger is either configured to emit a ping at a determined interval for a period of time or respond and/or answer to one or more pinging requests from a surface transceiver. In one embodiment, the pinger emits an acoustic ping or signal every 2-10 seconds for a period of 5-20 minutes from the time of initial deployment from a vessel. The pinger may be configured to change the duration of pings based on the intended water deployment depth. Likewise, the interval of pings can be varied based upon the depth and intended data analysis requirements. In another embodiment, the pinger is interrogated by a master transceiver and responds by an acoustic message depending on its frequency and predefined internal address, if any. The master transceiver may be located on or near the surface of a body of water (such as on or coupled to a surface vessel or surface buoy) or be in the body of water. In one embodiment, the acoustic pinging device is connected to a highly accurate clock and synchronized with it. The pinger may be actuated by automatic or manual methods on the deck of a deployment vessel prior to deployment. The pinger and/or its power supply may be configured to be replaceable for each deployment, and in some embodiments, the pinger is actuated by contact with water, thereby requiring the pinger to be configured to be exposed to water. In some embodiments, the acoustic pinging device might be actuated and de-actuated remotely by one or more of any surface transceivers to optimize its power consumption.

Monitoring and Positioning of Seismic Nodes

As discussed above, acoustic positioning transponders attached to the deployed cable or rope have traditionally been used to determine the positions of the cable/nodes during and after deployment. These systems are very expensive and are often not used as frequently as necessary for proper positioning of the sensors/nodes. A need exists for an improved method and system for the monitoring of cable deployed with nodes on the seabed, and in particular one that eliminates all or substantially all of the transponders typically used in such applications. In one embodiment, each autonomous seismic node is coupled with an acoustic pinging device whose signal may be detected by a deployment vessel and/or a plurality of surface buoys that is towed behind the deployment vessel. In another embodiment, a single acoustic pinging device is coupled to every second, third, or fourth node such that the system comprises less pingers than nodes. The emitted pings allow the deployment vessel to monitor and/or position the deployment of a plurality of autonomous seismic nodes that are deployed from the vessel. This system is much more cost effective than using transponders and allows better positioning and accuracy of deployed nodes. Further, the pingers may also be used to guide or position the cable and nodes as the deployment cable is being deployed. Still further, the use of a plurality of surface buoys connected to the deployment vessel eliminates the need for an expensive and complex acoustic positioning system mounted on a pole under a vessel (such as the commercially available system known as Hi-PAP or any other USBL system) that is traditionally located on a deployment vessel. Instead, a relatively simple acoustic transceiver can be used on the deployment vessel and the surface buoys to detect the emitted pings. Alternatively, while the preferred embodiment utilizes inexpensive surface buoys to detect the emitted pings, in other embodiments a plurality of autonomous surface vehicles or other devices can travel or be towed behind the deployment vessel and be used for monitoring and/or positioning of the nodes and deployment cable. In other embodiments, an ocean bottom cable with integrated pingers at selected locations can be deployed from a deployment vessel and monitored in a similar manner as described herein for autonomous nodes. In still other embodiments, the disclosed system is configured to assess the touchdown of a node and once it has achieved contact with the seabed, ensure that the node is not moving.

Figure 4:
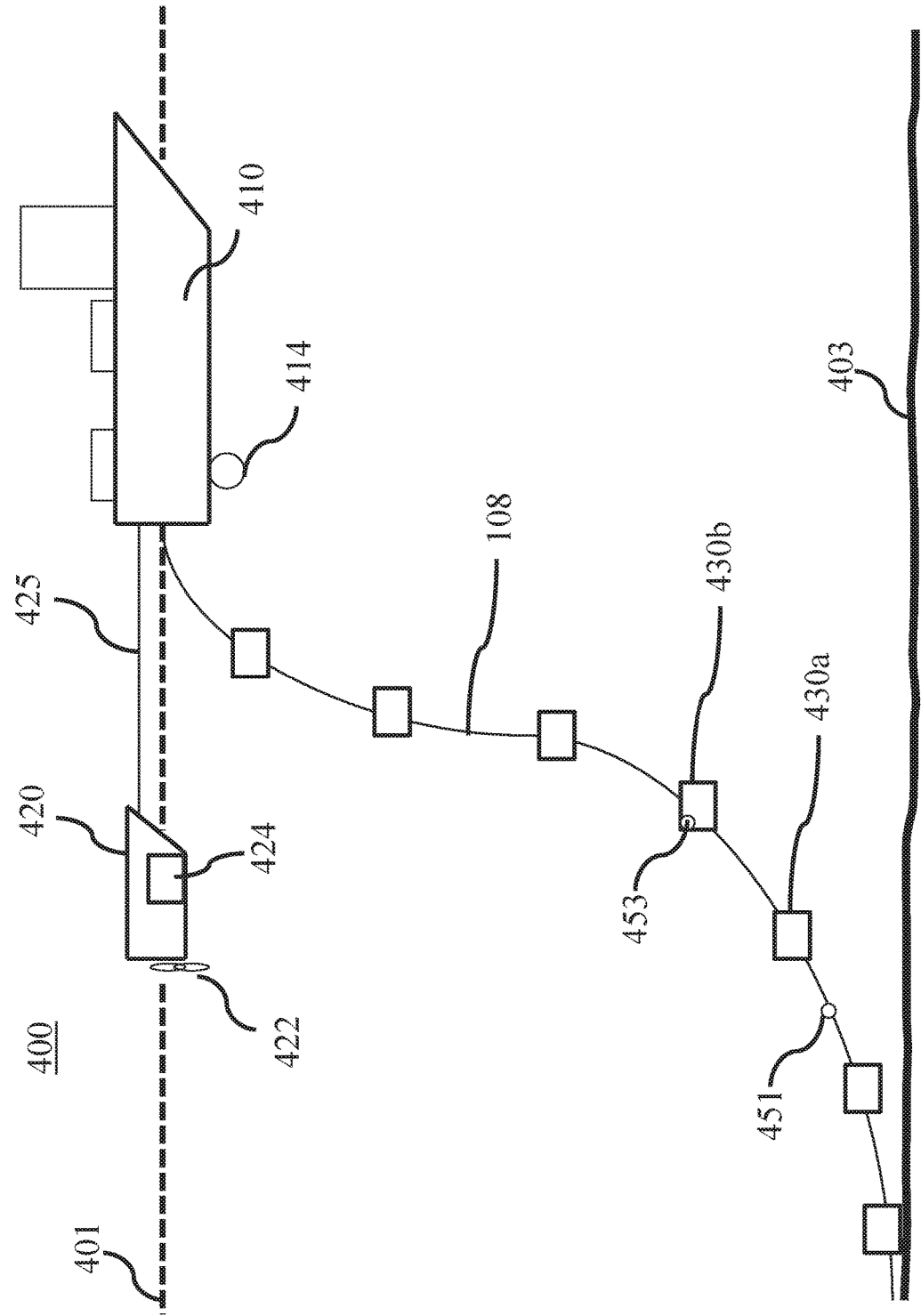
FIG. 4 illustrates one embodiment of a node monitoring system using a plurality of surface buoys.

FIG. 4 illustrates one system for using a single vessel to monitor and/or position the deployment of seismic nodes on or near the seabed. In one embodiment, deployment vessel 410 launches deployment line 108 from water surface 401 with a plurality of autonomous seismic nodes 430a, 430b attached to line 108. In one embodiment, each seismic node 430 may be coupled to a pinger (such as pinger 453) that is configured to emit a unique signal frequency for that particular node. In other embodiments, a pinger may be coupled to deployment line 108 between adjacent nodes, as is shown by exemplary pinger 451 in FIG. 4. In still other embodiments, a pinger may be placed between or coupled to every two, three, or four nodes. During deployment, each pinger emits a ping at a determined interval for a period of time. In one embodiment, the pinger emits a ping every 5-10 seconds for a period of 10-20 minutes after deployment from the vessel, which for normal operating conditions provides sufficient time for the node to reach seabed 403. In other embodiments, as mentioned above, each pinger may be configured to answer and/or otherwise respond to a request from one or more surface transceivers. Such a two-way configuration (interrogation by a surface transceiver and answer/response by a pinger) may be preferred for short-range distances and/or for its cost effectiveness as compared to a constantly emitting pinger signal system.

In one embodiment, deployment vessel 410 is coupled to acoustic receiver 414, which may be a transceiver. Acoustic receiver 414 is configured to detect the emitted pings from a plurality of nodes and/or associated pinging devices. A plurality of surface buoys 420 (only one is shown for convenience in FIG. 4) is coupled to deployment vessel 410 via one or more buoy connecting lines 425 or through a wireless-communications link. Each surface buoy 420 is coupled to an acoustic receiver 424 that is configured to detect the emitted pings from a plurality of nodes. As is known in the art based on any combination of communications principles (such as triangulation techniques), the deployment vessel is configured with appropriate computer systems to receive data from a plurality of geographic locations (acoustic receiver 414 and plurality of acoustic receivers 424) to calculate an accurate subsea position of an emitted ping. Because a ping is associated with a unique frequency for a specific node, the location of each node can be determined. In other embodiments, each surface buoy comprises a plurality of acoustic receivers. In one embodiment, the plurality of acoustic receivers are placed at different depths in the water, which provides greater accuracy on the calculated positions of the nodes. For example, acoustic receiver/transceiver 414 may be placed on a pole a certain depth beneath deployment vessel 410, which will be lower than any acoustic receivers 424 that are located on the water surface. In other embodiments, as mentioned above, the communications system may be a two-way communication system, in which case the surface buoys or vessels use one or more transceivers instead of receivers. In this configuration, one or more of the surface transceivers (such as one coupled to a surface vessel) is configured to interrogate and/or request a signal from one or more of the pingers. In response, the pinger is configured to answer and/or otherwise respond to a request from one or more surface transceivers. The answer from the pinger/transducer may be received by a plurality of the surface transceivers.

In one embodiment, surface buoy 420 may be towed behind deployment vessel 410 and, in broadest terms, is any floating device that can be towed behind a vessel on a surface of water and coupled to a receiver and/or transceiver. For example, in one embodiment, surface buoy comprises a buoy coupled to a metallic frame, with an acoustic transducer mounted at the bottom of the metallic frame, an acoustic transceiver mounted on top of the buoy, and a GPS antenna mounted on the top of the mast. In one embodiment, such a surface buoy may be any commercially available tail buoy, such as an 800L or 1050L tail buoy from PartnerPlast AS, or a custom made buoy. In one embodiment, surface buoy 420 may include a control system and/or navigation system and communicate with deployment vessel 410 via a cable and/or wireless communications link. In other embodiments, a control system and/or navigation system may be located on a deployment vessel 410 or other surface vessel and communicate with one or more of the plurality of surface buoys 420 via a cable and/or wireless communications link. Surface buoy 420 may be configured with a global positioning system (GPS) or other positioning system or device that provides the buoy's exact position and time.

Because a GPS receiver on the surface buoy, by itself, may not provide sufficient positioning coordinates for seismic applications, such a GPS receiver may be processed in parallel with another GPS system on the deployment vessel to have a range and bearing from the vessel to the buoy. Thus, in one embodiment, a relative GPS (RGPS) beacon is installed on surface buoy 420 and a reference antenna is installed on the deployment vessel 410 or another surface vessel (such as a seismic source vessel, which reduces calibration cost and mobilization efforts for antennae synchronization). In other embodiments, the GPS system on the buoy is an autonomous and stand-alone differential GPS (DGPS) system and comprises a GPS antenna and receiver on the mast of the surface buoy. DGPS is an enhancement to basic GPS and provides improved location accuracy, and receives differential correction signals based on/from a network of ground-based reference stations that correct potential inaccuracies in the basic GPS signal. In some situations, surface buoy 420 may veer off its intended position based on surface waves, vessel navigation or speed, etc., and thus surface buoy 420 may be equipped with a propulsion system 422 (such as a propeller) that maintains a desired position of the buoy and assists in proper positioning of the buoy in reference to the deployment vessel 410 and other surface buoys. In some embodiments, surface buoy 420 may be a self-positioning buoy that may be autonomous and self-propelled and have GPS-positioning capabilities with a navigation system. In other embodiments, surface buoy 420 may be directed in real time by an operator or merely towed behind the deployment vessel. In still other embodiments, surface buoy 420 may comprise a combination of these navigation options, such that it is towed behind the deployment vessel but also comprises a rudder or other steering device to help retain the buoy in an optimum position/offset from the subsea pingers.

Figure 6:
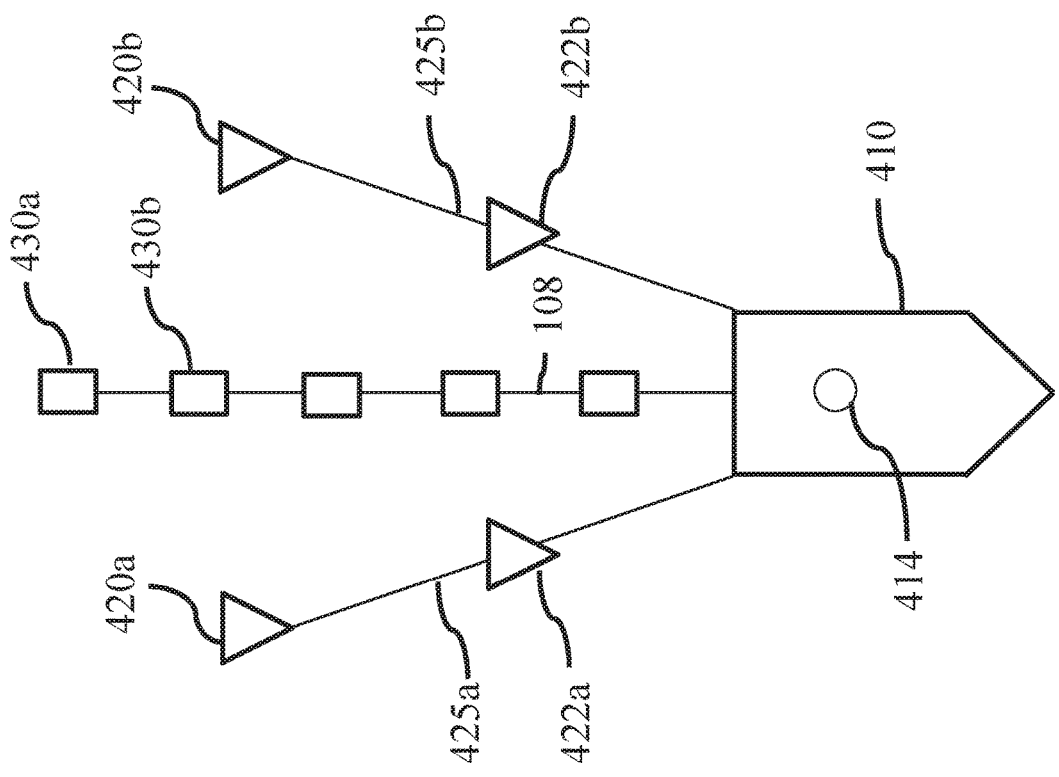
FIG. 6 illustrates another embodiment of a node monitoring system using a plurality of surface buoys.
Figure 7:
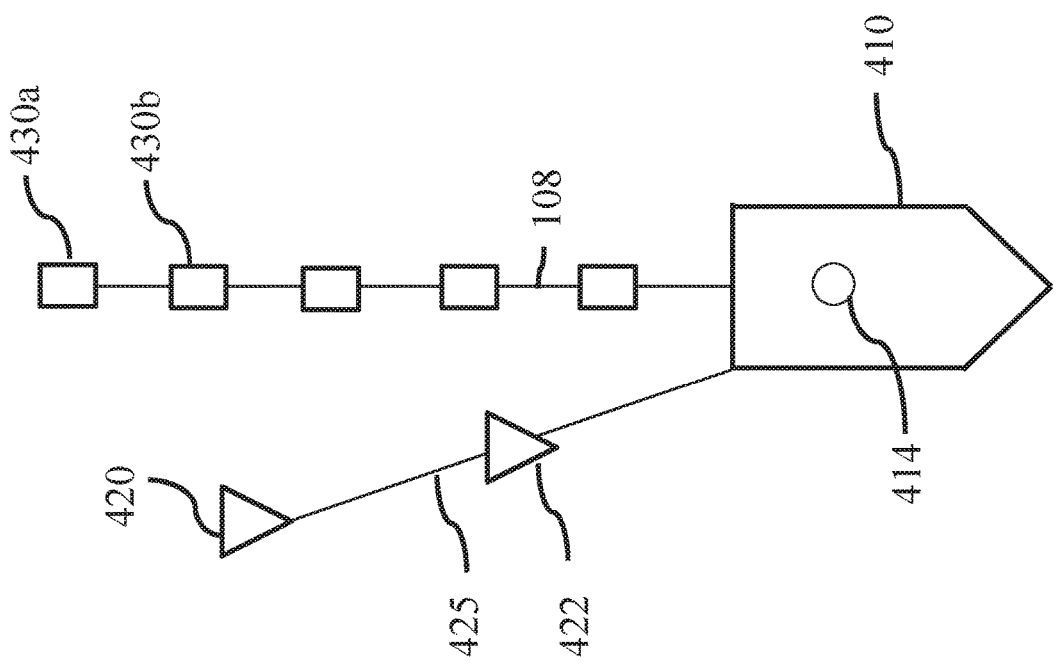
FIG. 7 illustrates another embodiment of a node monitoring system using a plurality of surface buoys.

Connecting line 425 may be a simple cable or wire, and connecting line 425 may provide power, data, and/or both power and data to and from plurality of surface buoys 420 and surface vessel 410. Each surface buoy needs a power source to provide power to any communications (e.g., transceiver/receiver) equipment, GPS equipment, and navigation/steering devices. Surface buoy may be fully autonomous and have its own power supply. In one embodiment, surface buoy 420 is equipped with batteries and/or local generating power sources (such as solar panels on the top of the surface buoy and/or water generators on the bottom of the surface buoy). In another embodiment, the buoy's power is provided from a surface vessel through a dedicated cable/umbilical (which may be the same cable to tow the buoy if it is not self-propelled). In still another embodiment, the power supply for the surface buoys may comprise both power sources for redundancy and/or increased power supply. Each surface buoy may also be configured to send (and potentially receive) data to/from a surface vessel, and in other embodiments, a surface buoy is configured to communicate with other surface buoys. In one embodiment, the buoy is configured with a cable telemetry device, such that data is provided to/from a surface vessel through a dedicated cable/umbilical (which may be the same cable to tow the buoy if it is not self-propelled). In another embodiment, the buoy is configured with a wireless telemetry device, such that data is provided to/from a surface vessel through a dedicated radio-communications link. In one embodiment, connecting line 425 is coupled to one surface buoy, but in other embodiments (such as shown in FIGS. 6 and 7), multiple surface buoys can be coupled to a single connecting line 425. While the preferred embodiment utilizes inexpensive marine floating devices (such as surface buoys) coupled to an acoustic receiver (or transceiver) to detect the emitted pings, a plurality of autonomous surface vehicles (USVs) can travel or be towed behind the deployment vessel and be used for monitoring and/or positioning of the nodes and deployment cable. In general, if a surface buoy is self propelled, autonomous in power, and sends data to a surface vessel via wireless means (such that the surface buoy is not directly connected to a surface vessel via a dedicated cable or line), the buoy may be considered to be a USV.

In one embodiment, system 400 is used to monitor and/or position the deployment of plurality of autonomous seismic nodes 430. Based on the calculated positions of plurality of nodes 430, the deployment vessel is able to track the deployment of nodes 430 and deployment line 108 in real-time or near real-time. With real-time (or substantially/near real-time) information on the location of the deployed nodes and deployment line, deployment vessel 410 can vary the deployment route of deployment line 108 for positioning of the nodes. Thus, the present disclosure provides a much simpler and cost effective procedure for accurate positioning of nodes on the seabed than previously possible. Further, the present disclosure not only monitors the positions of the nodes but also facilitates and/or guides the positioning of the nodes based on calculated positions of the nodes. Still further, system 400 may be configured to predict the touchdown position (i.e., the point of contact of a node to the seabed) of the nodes being deployed based on a calculation model with data supplied by the pingers. If the predicted touchdown position for a node is too far away from where a node (or a plurality of nodes) is supposed to be based on the survey requirements and planned coordinates/pre-plot position, then the deployment vessel can act on this estimated difference and vary certain parameters (such as vessel position and speed) to minimize the difference between the actual touchdown position and the planned node positions. In one embodiment, such a guidance and/or control system is located on vessel 410.

Figure 5:
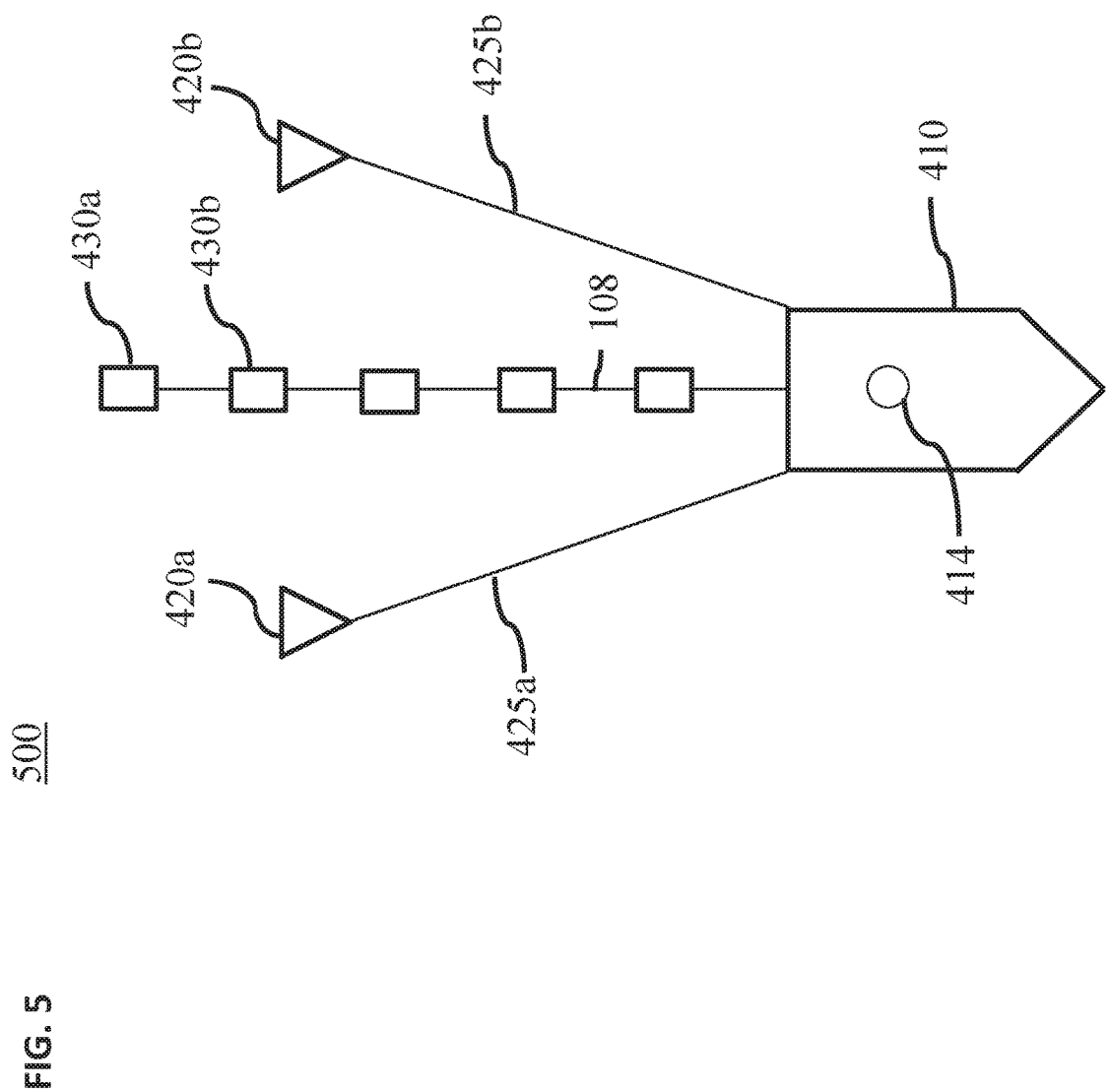
FIG. 5 illustrates another embodiment of a node monitoring system using a plurality of surface buoys.

FIG. 5 illustrates a top view illustration of monitoring system 500, which may be the same as or similar to system 400 from FIG. 4. Deployment vessel 410 is configured with acoustic receiver/transceiver 414 and tows a plurality of surface buoys 420 (such as first surface buoy 420a and second surface buoy 420b), with each buoy 420 being coupled to deployment vessel 410 via a buoy connecting line 425 (such as first connecting line 425a and second connecting line 425b) or through a wireless-communications link. As described in connection with FIG. 4, deployment vessel 410 and plurality of surface buoys 420 are each equipped with an acoustic receiver/transceiver to detect the emitted signals from the plurality of nodes 430. The further the plurality of surface buoys 420 are positioned from each other and the deployment vessel the more accurate the calculated position of the nodes. In one embodiment, in order to optimize the accuracy of the position calculated by this acoustic system, one or more receivers (or transceivers) 420 are placed on both sides of cable 108 connected to the plurality of nodes 430 (such as nodes 430a, 430b, etc.) and associated subsea pingers. In one embodiment, plurality of surface buoys 420 are positioned such that their respective positions provide optimized positioning through triangulation and provide a wide azimuth distribution of the acoustic ranges from and to the subsea pingers.

FIG. 6 illustrates another system for using a single vessel to monitor and/or position the deployment of nodes on or near the seabed. System 600 is similar to the system described in FIGS. 4 and 5, but uses a plurality of surface buoys 420 and 422 coupled to each connecting line 425 or through a wireless-communications link. Thus, in one embodiment, first connecting line 425a is coupled to first surface buoy 420a and second surface buoy 422a, while second connecting line 425b is coupled to first surface buoy 420b and second surface buoy 422b. The increased number of surface buoys provides more available data as to the position of the emitted pings, which allows a more accurate calculated position of the nodes. In various embodiments, none, some, or all of the plurality of surface buoys (e.g., buoys 420, 422) may be configured with a propulsion system (not shown) to facilitate accurate positioning of the surface buoys and/or to maintain a desired buoy position.

FIG. 7 illustrates another system for using a single vessel to monitor and/or position the deployment of nodes on or near the seabed. System 700 is similar to the system described in FIG. 6 but uses only a single connecting line 425 (or through a wireless-communications link) that is coupled to a plurality of surface buoys 420 and 422. The use of single buoy connecting line 425 decreases potential line tangling between additional connecting lines and deployment line 108.

Figure 8:
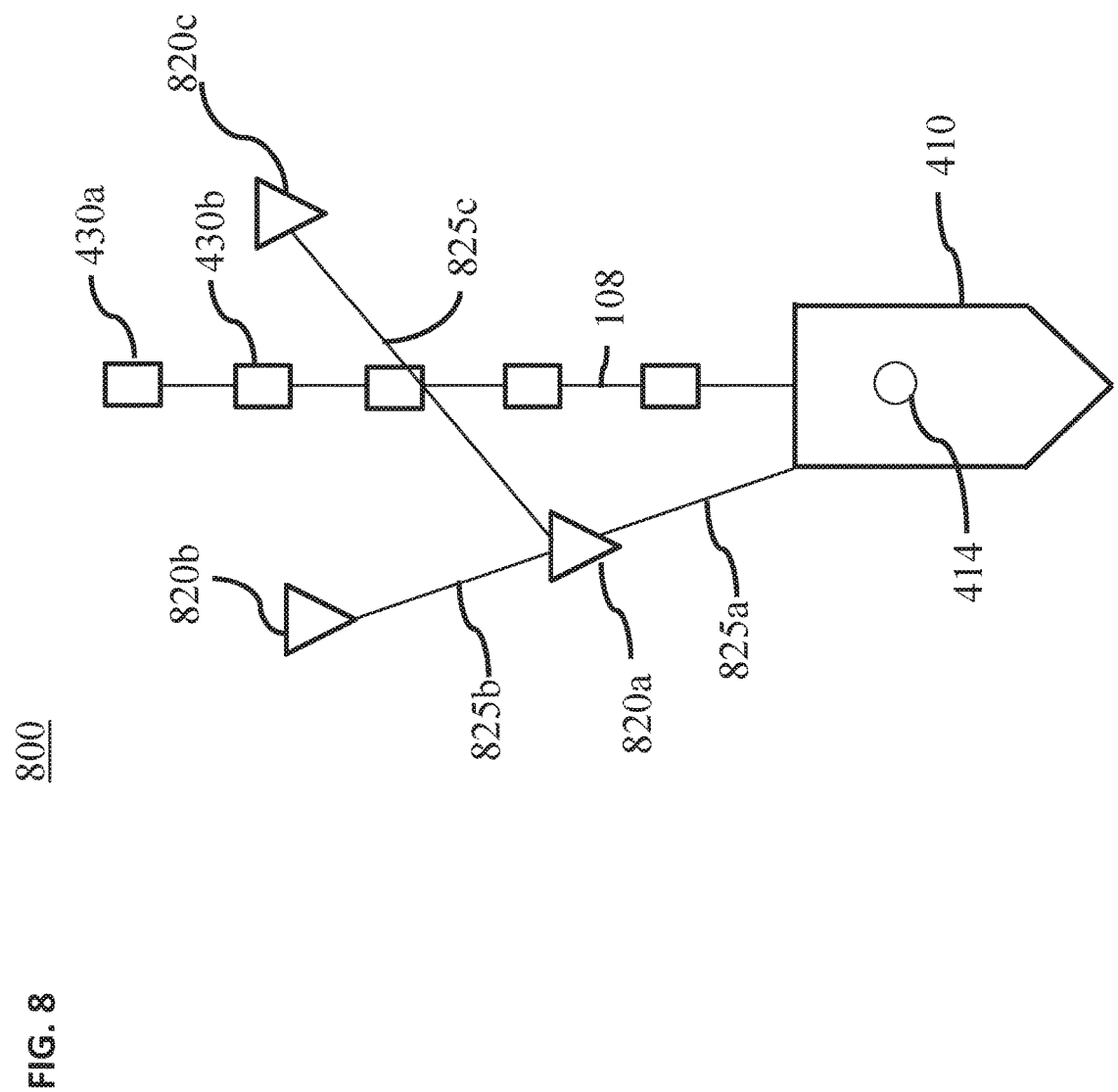
FIG. 8 illustrates another embodiment of a node monitoring system using a plurality of surface buoys.

FIG. 8 illustrates another system that is a combination of FIG. 6 and FIG. 7. Rather than having multiple connecting lines coming from the surface vessel (as is shown in FIG. 6), only one cable 825a is coupled to surface vessel 410 in monitoring system 800. However, a plurality of cables/connecting lines 825b and 825c are coupled to either cable 825a and/or surface buoy 820a such that a plurality of additional surface buoys 820b and 820c are placed on both sides of deployment cable 108 connected to the plurality of nodes 430 and associated subsea pingers.

Figure 9:
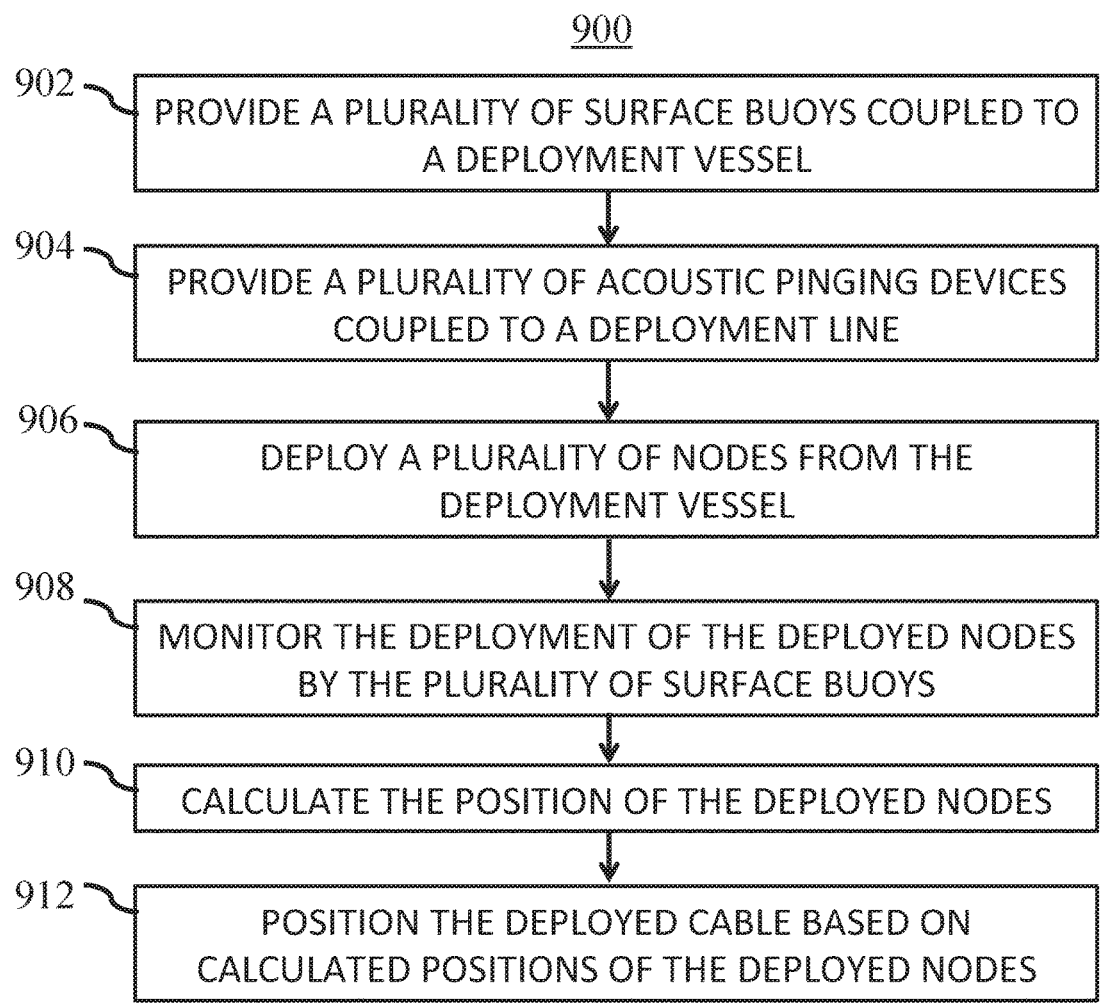
FIG. 9 illustrates one method of using a plurality of surface buoys to monitor node deployment.

FIG. 9 illustrates one embodiment of a method for monitoring and/or positioning of autonomous seismic nodes deployed on a deployment line and/or cable. In an embodiment, the method 900 includes providing a plurality of surface buoys coupled to a deployment vessel. The surface buoys can be coupled to the deployment vessel via a single buoy connecting line or multiple buoy connecting lines, and in other embodiments, no connecting line is used and the surface buoys are coupled to the deployment vessel wirelessly. Alternatively, USVs can be used instead of surface buoys. The method further includes providing a plurality of acoustic pinging devices coupled to a deployment line, as shown in block 904. In one embodiment, an acoustic pinging device is coupled to each autonomous seismic node. The pinger can be located within the node's pressurized housing or external to the pressurized housing, such as within a node bumper/fender. In other embodiments, the pinger may be a stand-alone unit that is directly coupled to the same deployment line as the seismic nodes such that one or more pingers may be spaced on the deployment line between one or more of the nodes. In other embodiments, only a subset of the plurality of nodes comprises an acoustic pinger, such that every two, three, or four nodes is coupled to or associated with an acoustic pinger. The method further includes deploying the plurality of nodes from the deployment vessel into a body of water, as shown in block 906. The nodes are preferably attached to a deployment line or cable. The method further comprises monitoring the deployment of the deployed nodes by a plurality of surface buoys, as shown in block 908. In one embodiment, each pinger on a node is configured to emit an acoustic ping for a predetermined time after deployment, and the plurality of surface buoys are configured to receive these pings. In other embodiments, each pinger is configured to respond to a request from a surface transceiver to transmit a ping, as discussed in more detail herein. Each surface buoy may be configured with an acoustic receiver, such as a hydrophone or similar device. Likewise, the deployment vessel may also be configured with an acoustic receiver. In other embodiments, the surface acoustic devices may be transceivers that interrogate and/or request pings from the subsea pinging devices. The method further comprises calculating the position of the plurality of nodes based upon the receipt and processing of the received pinger data from the plurality of surface buoys, as shown in block 910. Pinger data received from an acoustic receiver coupled to the deployment vessel may also be used in the calculated position. The node positions can be calculated after touchdown on the seabed as well as in route to the seabed after deployment from a vessel.

The method further comprises, based on the calculated positions of the nodes, positioning the route of the deployment cable to optimize the survey pattern, as shown in block 912. In one embodiment, the positioning step comprises guiding and/or controlling the deployment of nodes and deployment cable based on one or more predictions of a touchdown position of at least one node. For example, if the predicted touchdown position for a node is too far away from where a node is supposed to be based on the survey requirements and planned coordinates, then the deployment vessel can act on this estimated difference and vary certain parameters (such as vessel position and speed) to minimize the difference between the actual touchdown position and the planned node positions. In other embodiments, the speed of the winch may be varied which controls the slack/tension of the deployment line, which affects the position of the deployment line and the positions of the nodes and pingers. In still other embodiments, the disclosed system is configured to assess the touchdown of a node and once it has achieved contact with the seabed, ensure that the node is not moving. For example, once the node achieves contact with the seabed, the pinger coupled to the node (or, alternatively, a pinger coupled to the deployment line on either side of the node) continues to provide pings that are detected by the plurality of service receivers/transceivers. If calculations based on these pings show that the subsea pinging device is moving, this indicates that the position of the node is moving and/or has moved. Of course, one or more of these steps can be performed in various orders or may not be necessary in all situations. For example, providing surface buoys is not necessary prior to the deployment of the nodes. In some embodiments, the nodes can be deployed first and a short time thereafter the plurality of surface vessels are deployed. Likewise, in some situations, the positions of the nodes will just be calculated and monitored without any active guidance of the deployed cable based on the calculated positions. Likewise, instead of using a surface buoy, many other surface devices or vessels can be utilized, such as USVs.

All of the methods disclosed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of the node, acoustic pingers, and surface buoys are within the scope of the invention. For example, the node may or may not be directly attached to the deployment cable, and in some instances may merely be tethered to the deployment cable. The acoustic pingers may be directly attached to one or more of the nodes or may be merely coupled to the deployment cable in selected positions proximate to the nodes. In such a situation, the pingers may be selectively attached to the deployment cable based on the particular survey and other constraints. While a surface buoy is the embodiment discussed most in this disclosure, other surface devices that comprise a receiver or transceiver may be used, such as unnamed surface vessels (USVs). As another example, while embodiments described herein often times illustrate a physical cable connecting the surface buoys to the surface vessel, no such cable may be needed if the surface buoys or USVs are self-positioning and if any data communications to the surface vessel are done wirelessly. Similarly, a buoy connecting line may actually be composed of multiple wire segments, with each of the segments being connected to one or more surface buoys. Further, the disclosure is applicable for autonomous seismic nodes attached to a deployment cable or ocean bottom cable integrated with seismic nodes. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A monitoring system for the deployment of seismic nodes on or near the seabed, comprising:
    a plurality of ocean bottom seismic nodes coupled to a deployment cable;
    a plurality of acoustic pingers configured to emit a ping at a predetermined interval, wherein each of the plurality of acoustic pingers is coupled to a separate one of the plurality of seismic nodes;
    a surface vessel, configured to deploy the plurality of seismic nodes in a body of water; and
    at least one surface buoy coupled to the surface vessel by a first buoy connecting line, wherein each surface buoy comprises an acoustic receiver configured to detect the emitted pings from the plurality of acoustic pingers,
    wherein the monitoring system is configured to monitor a touchdown position of the plurality of seismic nodes on the seabed and communicate the touchdown position of each of the plurality of seismic nodes with the surface vessel at approximately the same time as touchdown.

2. The system of claim 1, wherein the buoy connecting line is configured to provide power to the surface buoy and data transfer between the surface buoy and the surface vessel.

3. The system of claim 1, further comprising a plurality of surface buoys, wherein at least one of the plurality of surface buoys is coupled to the surface vessel by a first buoy connecting line and at least one of the plurality of surface buoys is coupled to the surface vessel by a second buoy connecting line.

4. The system of claim 1, further comprising a plurality of surface buoys coupled to the surface vessel, wherein at least one of the plurality of surface buoys is positioned on one side of the deployment cable and at least one of the plurality of surface buoys is positioned on the other side of the deployment cable.

5. The system of claim 1, further comprising a plurality of surface buoys coupled to the surface vessel, wherein the plurality of surface buoys are configured to substantially remain in a predetermined position with respect to the other surface buoys.

6. The system of claim 1, wherein each of the plurality of acoustic pingers is associated with a unique ID.

7. The system of claim 6, wherein the unique ID is based upon a plurality of N frequencies and a plurality of Y internal addresses, wherein the number of unique IDs comprises N×Y unique IDs.

8. The system of claim 1, wherein each of the plurality of acoustic pingers is configured to emit a ping at a predetermined interval for a period of time, wherein the predetermined interval is at least 2 seconds and the period of time is at least 5 minutes.

9. The system of claim 1, wherein each of the plurality of acoustic pingers is coupled to and synchronized with a clock.

10. The system of claim 1, wherein the at least one surface buoy is an unmanned surface vessel.

11. The system of claim 1, wherein the at least one surface buoy is a self-positioning buoy.

12. The system of claim 1, wherein the at least one surface buoy is self-powered.

13. The system of claim 1, wherein the monitoring system is configured to identify the ID, position, depth, and height of each seismic node upon touchdown with the seabed.

14. The system of claim 1, further comprising a guidance system configured to guide the deployment cable from the surface vessel based upon node position data determined by the monitoring system.

15. The system of claim 1, wherein the surface vessel comprises an acoustic receiver configured to detect the emitted pings from the plurality of acoustic pingers.

16. The system of claim 1, wherein each of the plurality of acoustic pingers is configured to be remotely actuated by a surface transceiver.

17. The system of claim 1, wherein each of the plurality of acoustic pingers is configured to be actuated by contact with water.

18. The system of claim 1, wherein data is transmitted between the one or more surface buoys and the deployment vessel through a wireless link.

19. A method for monitoring the deployment of a plurality of seismic nodes on or near the seabed, comprising:
  deploying a plurality of ocean bottom seismic nodes from a surface vessel, wherein the nodes are coupled to a deployment cable, wherein each node is coupled to an acoustic pinger configured to emit a ping with a unique ID;
  providing one or more surface buoys coupled to the surface vessel, wherein each surface buoy comprises an acoustic receiver configured to detect the emitted pings;
  monitoring the deployment of the deployed seismic nodes by receiving the emitted pings at the one or more surface buoys; and
  modifying the deployment position of the cable from the surface vessel based on a touchdown position of one or more of the plurality of seismic nodes.

20. The method of claim 19, further comprising emitting pings from each of the acoustic pingers for a predetermined time after deployment of the autonomous seismic nodes from the surface vessel.

21. The method of claim 19, further comprising requesting each of the acoustic pingers to transmit a ping in response to a request from a surface transceiver.

22. The method of claim 19, further comprising determining the node position of one or more of the plurality of seismic nodes based on the received pings.

23. The method of claim 19, further comprising positioning the deployment cable from the surface vessel based on one or more of the determined positions of the plurality of seismic nodes.

24. The method of claim 19, further comprising modifying the deployment position of the deployment cable from the surface vessel based on one or more predicted touchdown positions of the plurality of seismic nodes.

25. The method of claim 19, further comprising modifying the deployment position of the cable from the surface vessel based on a difference between an actual touchdown position of a seismic node and a predetermined seabed position of the seismic node.

* * * * *